United States Patent Office 3,784,661
Patented Jan. 8, 1974

3,784,661
PROCESS OF BLOW MOLDING CONTAINERS FROM PARTICLE FORM POLYETHYLENE RESINS
Jerome Sandel Schaul, Bloomfield, Kurt Falke Wissbrun, Short Hills, and Martin John Hannon, Plainfield, N.J., assignors to Celanese Corporation, New York, N.Y.
No Drawing. Continuation-in-part of abandoned application Ser. No. 102,554, Dec. 29, 1970. This application Aug. 30, 1972, Ser. No. 284,806
Int. Cl. B29c 17/07; C08f 3/04, 45/08
U.S. Cl. 264—98
8 Claims

ABSTRACT OF THE DISCLOSURE

The present invention relates to a process of blow molding liquid containers from a specific class of all-particle form polyethylene resins; the process being carried out on blow molding machines operating at a pressure in the hydraulic system of less than about 1600 p.s.i. and generating an apparent shear rate, as the resin is extruded through the die gap, of between about 10,000 to about 100,000 reciprocal seconds. The particular type of all-particle form polyethylene resins are those having a density of from about 0.94 to about 0.97, a melt index of from about 0.1 to about 2.0 decigrams per minute, a die swell of from about 3.5 to about 4.5 and a critical stress for melt fracture of between about $1.0 \times 10^6$ to about $4.0 \times 10^6$ dynes per square centimeter.

This is a continuation-in-part of copending application Ser. No. 102,554, filed Dec. 29, 1970, now abandoned.

Polyethylene bottles, particularly as milk and juice containers have recently come to commercial prominence with the advent of high speed, high shear blow molding machines. These machines have had a considerable impact on the field because of their relative economics, high volume, ease of operation and mechanical simplicity compared to the previously used low shear machines. A problem has arisen, however, in that, to date, only the more expensive solution process resins or blends of resins comprising a substantial proportion of solution resin content have been found to possess the combination of properties required for molding on these machines. As will be explained in greater detail hereinafter, efficient operation of this specific type of blow molding machine requires a polyethylene resin which possesses a desired range of rheological properties within the preferred maximum operating pressure of the machines. As will also be explained in greater detail hereinafter these properties are to an extent pressure variable such that adjustment of the pressure on the resin, as it is forced from the extruder through the die gap, can correspondingly alter the rheological properties of the resultant parison so as to come within the desired ranges. While theoretically the maximum operating hydraulic system pressure of these machines is quite high, the combination of safety considerations and the interaction of several operating parameters, such as extruder cycle time, mold cycle time and respective temperatures and pressures etc., each of which is directly affected by the others, has restricted the actual maximum pressure which can be used to well below that of the theoretical maximum. In most of these machines the maximum permissible operating pressure which can be both safely accommodated in the hydraulic system and which will not adversely affect the other operating parameters has been found to be about 1600 p.s.i. Thus, a polyethylene resin to be efficiently blow moldable on these high speed, high shear machines must possess the desired rheological properties at hydraulic system operating pressures of less than about 1600 p.s.i. Equally as important the selected resin must be able to withstand the extremely high shear, on the order of 10,000 to 100,000 reciprocal seconds, experienced by the resin as it is forced from the extruder through the die gap without raising the pressure above about the 1600 p.s.i. practical maximum.

Briefly two rheological properties have been found critical to the effective operation of these high shear blow molding machines. The first is "flare" or the diameter increase experienced by the parison after it has been forced through the die gap and prior to blowing into the desired object. This is a time dependent characteristic of the elastic properties of the particular resin and must be neither too great, which would result in interference with proper closing of the mold, or too little, resulting in failure to extend to all parts of the mold cavity and, thus, improperly formed parisons. The second critical characteristic is the flow stability and surface conformity of the parison. That is, the parison must be a stable, smooth tube which neither pleats or distorts upon extrusion. As stated, to date, it has been believed that only solution prepared polyethlene resins or blends oyf polyethylene resins containing a comparatively large proportion of solution resin content were suitable for high shear blow molding.

Solution resins can broadly be defined as polyethylene prepared by a process wherein both the monomeric ethylene and the polymer are soluble in the same solvent system. These resins are characterized by a very broad molecular weight distribution and an optimum average molecular weight, both of which combine to produce the desired flare and parison stability within the preferred maximum operating pressure of high shear blow molding machines. However, since these polymers are formed in solution, the additional expense which must be incurred for their precipitation and recovery seriously effects the economics of using these resins in the pure form for the purpose of blow molded liquid containers.

Successes in overcoming the problem of economics have been noted with the use of blends of resins prepared by the solution process and resins prepared by any of the lower cost particle form methods; although, the degree of success has heretofore been correlatable to the presence of solution process resin in the blend. Three distinct processes and the resins generated thereby are generally classified under the generic term "particle form." In order of historical development they are the basic particle form, processable particle form and alkoxide processable particle form. For purposes of the present discussion the term "particle form" is intended to describe a resin or blend of resins by any of these three methods. The basic particle form process involves a system wherein the monomer is soluble in a solvent such as isobutane, whereas the polymer is not, the polymer precipitating from the solution as it is formed. Particle form resins prepared by the basic process are considered quite difficult to work with, being characterized by a relatively narrow molecular weight distribution concentrated at the high end of the spectrum. The processable particle form and alkoxide processable particle form process are modifications of the basic process; the processable particle form process differs from the basic process by the addition of hydrogen, higher catalyst activation temperature and higher process temperature, all of which combine to result in a lowering of the average molecular weight into a more processable range. Alkoxide processable particle form resins are prepared by a refinement of the processable particle form process involving catalyst which has been treated with a suitable alkoxide such as diethyl aluminum ethoxide; of the three they have the broadest molecular weight distribution.

None of these particle form type polyethylene resins have heretofore been found or were believed to possess the desired rheological properties required for high shear blow molding at the operating pressures normally encountered in such machines. That is, when the pressure in the hydraulic system is maintained below the desired about 1600 p.s.i. these resins, either fracture and/or pleat and/or do not demonstrate flare within the required range of values.

The problem, therefore, has been to provide a polyethylene resin suitable for use in high shear molding machines which has a minimum presence of solution process resin, most preferably a resin or a blend of resins prepared entirely by the particle form process.

SUMMARY OF THE INVENTION

The present invention addresses itself to this problem and has discovered a process for blow molding containers of polyethylene comprised substantially of particle form resins on machines generating an apparent rate of shear between about 10,000 and about 100,000 reciprocal seconds and operating at hydraulic system pressures of less than about 1600 p.s.i. More particularly, the present invention has found that particle form resins can be processed on blow molding machines operating at this pressure and rate of shear if the resins have a melt index between about 0.1 to about 2.0 decigrams per minute, a density of from about 0.94 to about 0.97, a die swell of between about 3.5 to about 4.5 and a critical stress for melt fracture of between about $1.0 \times 10^6$ to about $4.0 \times 10^6$ dynes per square centimeter.

DETAILED DESCRIPTION OF THE INVENTION

The high speed, high shear blow molding machines, which the all-particle form polyethylene resins of the present invention are intended to be used with, are best characterized by the apparent shear rate, on the order of about 10,000 to about 100,000 reciprocal seconds experienced by the resin as it is forced from the extruder through the die gap, and a desired maximum operating pressure in the hydraulic system of about 1600 p.s.i. There are several types of machines which fit this general description. It may be said of each of them, however, that heretofore, considerable difficulty was encountered when all-particle form type resins or blends of resins comprised substantially of particle form type resins were run on the machines and that the resins of the present invention can be consistently and successfully accommodated thereon. For purposes of the present discussion and exemplification, a high shear machine of the type sold under the name "Uniloy" and manufactured by Hoover Ball and Bearnig Company will be described in detail. The blow molding machine has three basic parts: an extruder; a hydraulic system; and a mold fixedly positioned just below the die head of the extruder. Actually, a typical machine has a series of four such die heads and molds operating simultaneously and supplied by a common manifold. The extruder is a hollow heated cylinder containing a screw which is constantly turning and intermittently reciprocating. Plastic resin is fed in at one end of the extruder, melted by the heat and transferred by the continuous rotation of the screw towards the discharge end of the extruder. The hot melt at the discharge end of the extruder accumulates pushing the screw back in the cylinder to make room; when sufficient melt is present the hydraulic system plunges the screw forward, forcing the accumulated melt out through a set of dies at the discharge end.

The dies are comprised essentially of an outer bushing and an inner mandrel, mounted in a die head which is attached to the discharge end of the extruder; the space between the mandrel and bushing being adjustable and being referred to as the die gap. Melt forced out of the extruder by reciprocation of the screw flows around the mandrel and out through the annular die gap passage between the mandrel and the bushing, emerging into the open air as a hollow tube or "parison."

The mold is fixedly positioned below the extruder and comprises two movable halves which interengage to close about the parison. A tube positioned inside the mandrel commonly referred to as a blow pin descends into the mold cavity neck as the mold closes, sealing off the mold cavity and channeling compressed air into the trapped parison blowing it up like a balloon in the mold cavity. The mold is constantly cooled usually by circulating water, effecting a heat transfer from the hot parison to the mold, thereby freezing the parison into the shape of the mold cavity. At this juncture, the air pressure is exhausted back through the blow pin after which the blow pin is withdrawn, the mold opens and the finished article is stripped off and the mold cycle begun again by the discharge of a fresh parison which has been accumulating during the above operation.

The air pressure utilized to blow mold the parison is usually in the range of from about 50 to about 150 p.s.i.; the maximum operating pressure of the extruder itself is typically about 5000 p.s.i.; and the maximum operating pressure in the hydraulic system is normally about 1600 p.s.i.

As outlined above, efficient operation of these blow molding machines requires a polyethylene resin demonstrating a desired range of rheological properties within the preferred maximum operating pressure generated by the hydraulic system of these machines. The most notable of these properties are flare and parison stability. Flare can be broadly defined as the phenomenon of diameter increase of the parison immediately after extrusion from the die. That is, as the resin tube is extruded through the die gap its diameter is that of the die. However, it immediately begins to flare out so that the parison when trapped by the closing mold halves is about 15 percent larger than the die diameter. The exact amount of flare or diameter increase is a complicated effect of several factors, which although not completely understood, may be classified under the design, flow conditions and resins characteristics. It should be understood, however, that not any amount of flare is acceptable. That is, if there is insufficient parison flare, the resultant bottles will be poorly formed, particularly in the handle sections. Similarly, if flare is too great, the parison will interfere with proper closing of the mold.

The second of these critical characteristics is the stability and surface conformity of the parison as it emerges from the die during extrusion. That is, the parison must not form a rough surface, pleat, form folds in its surface or otherwise distort since these may also appear in the finished article.

As was also stated above, these two conditions are to an extent variable with pressure. That is, adjustment of the pressure in the hydraulic system as the melt is forced through the die gap can correspondingly alter the flow conditions of the resin so that they become compatible with the rheological properties of the resin. However, in the case of polyethylene resins prepared by the particle form processes it has been found that the pressure required in the hydraulic system to move these properties into the proper range was often outside the maximum preferred operating hydraulic pressure for these high shear blow molding machines.

It should be understood at this juncture that while the maximum operating pressure attainable by these machines is quite high and more than sufficient to blow mold articles of polyethylene resins prepared by the particle form processes, the maximum pressures which are actually used in the preferred operation of these machines are well below the maximum attainable and also below the pressures required when blow molding particle form resins. That is the combination of safety-design features and the interaction of the several variables in the high shear blow molding operation, e.g., extruder cycle time, mold cycle time and respective temperatures and pressures, etc., each of which is dependent upon the other, has restricted the maximum operating pressure in the hydraulic system, which can be actually used without adversely affecting safe operation and the other operating variables, to a level well below the theoretical maximum operating pressure. In the great majority of these machines this maximum pressure in the hydraulic system has been found to be about 1600 p.s.i.

Equally as important, the extremely high shear experienced by the resin as it flows from the extruder through the die gap to form a parison, characteristic of these machines, must not raise the pressure in the hydraulic system above the desired maximum of about 1600 p.s.i. Thus, to date, it was believed that only solution prepared resins or blends of resins containing a large proportion of solution prepared resins had the balance of rheological properties at operating pressures under about 1600 p.s.i. in the hydraulic system and would not inordinately raise the operating pressure above this level due to the 10,000 to 100,000 reciprocal seconds shear rate experienced by the resin during formation of the parison.

Solution resins can be broadly described as those prepared by a process wherein both the monomeric ethylene and the polymer are soluble in the solvent used, usually cyclohexane, or cyclopentane. They are characterized by a very broad molecular weight distribution and desirable rheological properties which enable such resins to satisfactorily process under these above operating conditions. However, since the polymer is formed in solution, the additional expenditure which must be incurred to precipitate and recover it from solution has a disproportionate affect on the economics of using these resins in their pure form for the purpose of blow molding liquid containers.

A limited response to this problem has been found in blending solution prepared polyethylene resins with resins prepared by any of the less expensive particle form processes; although the degree of this success has heretofore been a function of the amount of solution resin present in the blend. Three general processes are usually grouped under the heading of "particle form;" in order of historical development they are: basic particle form, processable particle form and alkoxide processable form.

Broadly speaking, in the basic particle form process as in the other particle form type processes, the monomeric ethylene is soluble in a suitable solvent such as isobutane and the polymer is not, the polymer precipitating from solution as it is formed. Polyethylene resins prepared by the basic particle form method are characterized by a relatively narrow molecular weight distribution and a high average molecular weight. This later occurrence renders these resins quite viscous and otherwise intractable during melt conditions making them very difficult to mold. Processable particle form resins also have a somewhat narrow molecular weight distribution, but they have a much lower and, therefore, more desirable average molecular weight; and, as the name implies, are thus easier to mold and otherwise process than the basic particle form resins. The method of preparation of these more processable resins differs from the basic process by the addition of hydrogen, higher operating temperature and higher catalyst activation temperature, all of which are believed to have an effect on lowering the average molecular weight and hence enhancing viscosity of the melt and its processability.

Alkoxide processable particle form resins are prepared by a modification of the processable particle form process involving treatment of the catalysts, usually chromium oxide on a silica support, with an alkoxide such as diethyl aluminum ethoxide prior to introduction into the reactor. Polyethylene resins prepared by this process differ from processable particle form resins by a broader molecular weight distribution.

As stated, it would be most desirable if these less expensive particle form type resins or blends of resins comprised substantially of particle form type resins could be accommodated on high speed, high shear blow molding machines. For purposes of the present invention the term "particle form" resin is intended to encompass polyethylene prepared by any of the above described particle form processes. For purposes of the present invention a blend of resins comprised substantially of particle form type resins is intended to contain at least about 80 weight percent of particle form resins. Also for purposes of the present invention "high speed, high shear blow molding machines" are those operating at a hydraulic system pressure of less than about 1600 p.s.i. and which generate an apparent shear rate of between about 10,000 and about 100,000 reciprocal seconds as the resin flows from the extruder through the die gap. The present invention has found that this result can be accomplished, that is, that a particular class of particle form resins can be prepared or blended so as to have physical properties suitable for use on high speed, high shear blow molding machines. These resins which are best defined by reference to their physical properties, are polyethylene resins having a density of from about 0.94 to about 0.97, melt index of from about 0.1 to about 2.0 decigrams per minute, die swell of from about 3.5 to about 4.5 and critical stress for melt fracture of from about $1.0 \times 10^6$ to about $4.0 \times 10^6$ dynes per square centimeter. That is, it has been discovered that there is a specific class of all-particle form resin which can be accommodated either alone or in blends wherein particle form resins comprise at least about 80 weight percent of the blend, in high speed blow molding equipment wherein the apparent shear rate experienced by the polymer as it is forced through the die gap is greater than about 10,000 and less than about 100,000 reciprocal seconds, and the preferred maximum pressure in the hydraulic system is less than about 1600 p.s.i.; these all-particle form resin have a density, melt index, die swell and critical stress within the above defined critical ranges.

Density and melt index determinations are standard operations, well known to those skilled in the art, described, for example in ASTM test D–1505 for the former and ASTM test D–1238 for the latter. Die swell is a phenomenon peculiar to visco-elastic liquids and may be defined in respect to blow molding as expansion in the wall thickness of a molten parison as it emerges from a die. The usual method of measuring die swell involves a capillary rheometer, such as a Sieglaff-McKelvey gas pressure driven capillary rheometer having a heated barrel with internal diameter of approximately 0.312 inch. Polymer is introduced into the heated barrel, the barrel having a capillary die which has a 40° included angle of entry with a diameter of 0.05 inch and a length to diameter ratio of 2.5. A piston is positioned in the barrel for forcing the polymer from the barrel through the capillary and out the die. The polymer melt is extruded by means of the piston through the capillary die into an oven maintained at 190° C. at a speed which provides an apparent shear rate equivalent to 11,000 reciprocal seconds. The polymer melt is then allowed to soak for five minutes at 190° C. and the extrudate sample, for comparison, is obtained by cutting a ¼ inch length of the extrudate near the bottom where it has swollen with a film cutter notched to hold the extrudate. The sample is weighed and the die swell is then calculated as the ratio of extrudate diameter to capillary diameter.

Critical stress for melt fracture is measured on the same equipment and under the same basic conditions as die swell. The determination in this case, however, being the pressure or force, measured in dynes per square centimeter, exerted on the resin as it flows through the capillary and into the die at the time melt fracture i.e. distortion of the extrudate is apparent. Each polyethylene resin has its own inherent critical shear stress, below which the resultant parison will be rough or distorted when it has been extruded through the die. That is, if the operating conditions of the blow molding machine is set below the critical shear stress of the particular resin, the parison will have a rough uneven surface appearance, form folds and otherwise distort.

Since the chemical composition of this class of resins is essentially similar to that of other polyethylene resins falling outside the class they are best defined by reference to their physical properties. Four critical properties, each of which must be present within the desired ranges, have been found which differentiate these resins from other polyethylene resins. First off, the melt index, which is related to the viscosity of the resin, should be in the range of 0.1 to 2.0 decigrams per minute; preferably 0.4 to 1.0 decigram per minute. It has been found that for all-particle form resins, values below 0.1 decigram per minute makes rapid extrusion difficult, requires excessive power and raises heat generation. Similarly, too high a value for melt index results in sagging and pleating of the parison as well as sticking of the parison to mold and blow pin.

Second, the density of the all-particle form polyethylene resin should be in the range of 0.94 to 0.97. Polyethylene resins, particularly all-particle form resins outside of this range have not been found suitable for high shear blow molding.

Third, the die swell of the resin should be in the range of from about 3.5 to about 4.5 with a preferred value being from about 3.7 to about 4.0. Die swell within this range in concert with the other critical operating parameters, surprisingly results in a parison which satisfies the requirements of these high shear blow molding machines. It has been determined that a die swell outside of this critical range for all-particle form polyethylene resins produce either a parison which is too thin for good bottle blowing, is excessively pleated and lacks sufficient flare.

Finally, the critical stress for melt fracture should have a value of between about $1.0 \times 10^6$ and about $4.0 \times 10^6$ dynes per square centimeter with a preferred range being from about $1.5 \times 10^6$ to about $3.8 \times 10^6$ dynes per square centimeter. As with the other above critical parameters it has been determined that an all-particle form resin having a critical stress for melt fracture below about $1.0 \times 10^6$ and above about $4.0 \times 10^6$ dynes per square centimeter generates unstable parisons which are prone to melt fracture.

The following examples show, without limiting the present invention, results generated by blow molding one gallon milk bottles from several blends and types of polyethylene resins. The bottles had integral handles, the bottle weight for each sample was 90 grams and the density of the resins in each sample was between 0.94 to 0.97. For purposes of the present comparison an acceptable melt fracture rating is less than about 2 based on the following rating system.

TABLE I

| Rating | Degree of parison in stability | Description of parison in stability |
|---|---|---|
| 0 | None | |
| 1 | Very slight | Very slight scaliness over all or most of surface, or slight at top only. |
| 2 | Slight | Slight scaliness over surface, or medium at top only (or on bottle neck only), or incipient streaking or V formation. |
| 3 | Medium | Medium scaliness over surface, or severe at top only, or appreciable streaks or V fracture. |
| 4 | Severe | Heavy scale, or scaly with frosty area at top, or prominent streaks or V's. |
| 5 | Very severe | V or streaky fracture predominant; irregular bulging or rippling in or above fracturing area; or frosty appearance of entire parison (bottle apparently not fractured). |

Flare is determined by measuring the linear distances, in inches, of the flash along the parting line from the base of the neck to the end of the flash on the handle side and on the side opposite the handle and then adding them together. An acceptable level is about 4.5 inches.

The molding was performed on a Uniloy, Model 2012 having a 2½ inch diameter extruder with a length to diameter ratio of 20:1; the mold was a 4-finger gallon milk container. Temperature in the extruder was maintained at 325° F.; the screw in the extruder rotated at 56 r.p.m.; charge hydraulic pressure was 50 p.s.i.g.; and, pressure ring eccentricity was 0.011 inch forward. Mold coolant temperature was about 74° F.; mold closing time was 0.9 second; blow air pressure was 80 p.s.i.g.; exhaust time was 1.5 seconds; and tail length was about 1.75 inches.

The polymers, for the blends, are prepared as follows:

SOLUTION RESIN 150 grams of ethylene are introduced to and dispersed in a 1.5 liter vessel containing 400 milliliters of cyclohexane and 0.20 gram of chromium oxide on a silica base catalyst. The temperature is raised to 280° F., the pressure was maintained at 450 p.s.i. and the mixture is stirred; the reaction is allowed to proceed for 60 minutes. Recovery of the polyethylene, which is soluble in the cyclohexane is accomplished by flashing of solvent. The polymer has a density of 0.96 and a melt index of 0.7.

BASIC PARTICLE FORM RESIN 150 grams of ethylene are introduced to and dissolved in a 1.5 liter vessel containing 400 milliliters of isobutane and 0.15 gram of chromium oxide on a silica base as a catalyst. The temperature is raised to 218° F., the pressure is maintained at 450 p.s.i. and the mixture is stirred. The reaction is allowed to proceed for 60 minutes, polymerization being noted by the precipitation of a solid material from the solution. The liquid is removed by flashing and the polymer then dried. The resultant polymer has a density of 0.952 minimum and a 10× melt index of 6.0.

PROCESSABLE PARTICLE FORM RESIN 150 grams of ethylene are introduced to and dissolved in a 1.5 liter vessel containing 400 milliliters of isobutane and 0.10 gram of chromium oxide on a silica base as a catalyst. The temperature is raised to 220° F., the pressure maintained at 550 p.s.i. The reaction is allowed to proceed for 90 minutes. The liquid is removed by flashing and the polymer then dried. The resultant polymer had a density of .960 and a melt index of 0.70.

ALKOXIDE PROCESSABLE PARTICLE FORM RESIN 150 grams of ethylene are introduced to and dissolved in a 1.5 liter vessel containing 400 milliliters of isobutane. 0.1 gram of an alkoxide activated chromium oxide on a silica base catalyst are introduced to the vessel, the temperature is raised to 220° F. the pressure maintained at 550 p.s.i. and the mixture is stirred. The catalyst is activated by addition of 3 percent by weight of catalyst of diethyl aluminum ethoxide and then introduced into the ethylene prior to introduction of ethylene. The reaction is allowed to proceed for 90 minutes. The liquid is removed by flashing and the polymer then dried. The resultant polymer had a density of .960 and a melt index of 0.7.

The blends of resins for the blow molding trials were prepared by standard blending techniques.

TABLE II

| Example | Composition by weight | Melt index | Critical stress for melt fracture | Die swell | Blow molding pressure required for acceptable— | | Remarks |
|---|---|---|---|---|---|---|---|
| | | | | | Parison stability | Flare | |
| 1 | 60% solution-40% PF | .7 | 3.3 | 3.88 | 1,500 | 1,500 | |
| 2 | 15% solution-85% PF | .55 | 4.3 | 3.40 | 1,760 | 1,650 | |
| 3 | PPF | .42 | 4.0 | 3.24 | 1,670 | 1,530 | |
| 4 | PPF | .78 | 4.8 | 3.52 | 1,760 | 1,690 | |
| 5 | Alkoxide | .8 | 1.3 | 4.82 | 1,500 | 1,500 | Pleated badly. |
| 6 | do | .8 | 2.3 | 4.65 | 1,500 | 1,500 | Do. |
| 7 | 70% PPF-30% alkoxide | .7 | 3.0 | 3.9 | 1,500 | 1,500 | |
| 8 | 80% PPF-20% alkoxide | .7 | 3.6 | 3.82 | 1,500 | 1,500 | |
| 9 | PPF | .8 | 3.5 | 3.8 | 1,500 | 1,500 | |
| 10 | Alkoxide | .8 | 3.0 | 3.9 | 1,500 | 1,500 | |

Looking now to this data, in Table II, it can be seen from Example I, where the solution resin is the major portion of the polyethylene blend, and the resultant melt index, critical stress and die swell are within desired limits, that acceptable parison stability and flare can be attained within the preferred maximum operating pressure in the hydraulic system of 1600 p.s.i. However, as demonstrated by Example 2, with only 15 percent solution resin content and with critical stress and die swell outside the desired limits, the operating pressures required for acceptable parison stability and flare are higher than the preferred maximum of 1600 p.s.i.; and, thus, from a practical standpoint this resin blend cannot be efficiently or effectively blow molded on this type of high shear machine. Examples 3 to 6 show results with various all-practice form resins which are not prepared according to the present invention. Note particularly, in Example 3 that while critical stress is within the desired range, die swell is too low; similarly in Example 4, the die swell is acceptable but critical stress is too high. Accordingly, in both cases operating pressure in the hydraulic system is above the preferred maximum and in both cases these resins can be blow molded on these machines only with great difficulty. Examples 5 and 6 are special cases which demonstrate, that even though acceptable parison stability and flare could be attained below an operating pressure of 1600 p.s.i., the high die swell resulted in extreme pleating of the parison and an unacceptable final product.

Examples 7 to 10 are directed to the present invention and show that quite surprisingly all-particle form resins in both their pure and blended forms, can, if they have density, melt index, critical stress and die swell within the parameters discussed above, produce acceptable flare and parison stability at operating pressures well below the preferred maximum. The unexpected results of the present invention are most clearly shown by comparisons between Examples 3, 4 and 9 and between Examples 5, 6 and 10. In Example 3 the critical stress is within the preferred range, but die swell is outside the range; in Example 4, on the other hand, the die swell is within the desired range and it is the critical stress which is too high. Note that in both cases, wherein only one variable is outside the ranges defined by the present invention unacceptable results are produced. To the contrary, and surprisingly, in the case of Example 9, which has critical stress and die swell within the limits discovered by the present invention, very acceptable results are obtained at operating pressures below 1600 p.s.i. The acceptable flare and parison stability are produced below 1600 p.s.i. only when the resin has critical stress and die swell within the limits defined by the present invention.

It is within the scope of the present invention to incorporate into the resin, prior to blowing, from about 2 to about 60 weight percent of various fillers and reinforcing agents such as, glass graphite, talc, mica, and the like. It is particularly preferred in the case of milk and juice bottles to incorporate from about 0.01 to about 15 weight percent of fillers and pigments which function as opacifiers to restrict passage of ultra-violet rays through the bottle such as titanium dioxide, carbon blacks, zinc oxide, antimony trioxide, zinc sulfide, lithopane and the like into the resin since it has been found that these fillers at these levels, have a substantial effect on retaining the vitamin content of such liquids over long periods of time. The most preferred levels for these fillers are from about 0.5 to about 7 weight percent. That is, the vitamin content level in milk and juice, most notably the former, is effected by ultra-violet radiation, the vitamin content level declining dramatically with increased exposure. By way of example, several samples of milk stored in clear glass containers and exposed to fluorescent light, under refrigeration conditions at 40° F. lost 80 percent of their vitamin A content in 12 to 14 days. It has been surprisingly discovered, however, that milk when stored in polyethylene bottles prepared according to the present invention and blended with 3 weight percent of titanium dioxide, stored under identical conditions will lose only about 10 percent of their vitamin A in 12 to 14 days.

This condition of very rapid vitamin loss within a short time span has had a substantial effect on the dairy industry requiring that milk be processed, bottled and sold within two to three days. This, in turn, has meant that dairies must be located very close to the sales outlet and has resulted in a proliferation of dairies each serving a very small area. However, by incorporation of this type of filler into polyethylene bottles prepared according to the present invention, milk and juice can be stored for much longer periods of time; in point of fact a 21 day test under the above conditions only resulted in a vitamin A loss of about 12 percent. This is quite an acceptable level since milk stored in clear bottles lost 30 percent vitamin A in only 3 days under these conditions.

By way of review, it has been found that there is a specific class of all-particle form polyethylene resins which can be efficiently blow molded on high speed machines operating at pressures in the hydraulic system of less than about 1600 p.s.i. and generating an apparent shear rate of between about 10,000 to about 100,000 reciprocal seconds. Four critical parameters, each of which must be present within the desired ranges, are used to define these particular resins and to differentiate them from other polyethylene resins. These parameters are a density of from about 0.94 to about 0.97, a melt index of from about 0.1 to about 2.0 decigrams per minute, most preferably 0.4 to 1.0 decigram per minute, a die swell of from about 3.5 to about 4.5, preferably about 3.7 to about 4.0, and a crtical stress for melt fracture of between about $1.0 \times 10^6$ to about $4.0 \times 10^6$ dynes per square centimeter, most preferably $1.5 \times 10^6$ to about $3.8 \times 10^6$ dynes per square centimeter.

As this invention may be embodied in several forms without departing from the spirit or essential character thereof, the present embodiments are illustrative and not

What we claim is:

1. A process for blow molding polyethylene comprised substantially of particle form resins into liquid containers on high speed, high shear blow molding machines comprising an extruder having a die gap at one end thereof and an openable mold positioned adjacent the die gap comprising extruding the polyethylene resin through the die gap to form a parison, the polyethylene comprised substantially of a resin having a density of between about 0.94 to about 0.97, a melt index of from about 0.1 to about 2.0 decigrams per minute, a die swell of from about 3.5 to about 4.5 and a critical stress for melt fracture of between about $1.0 \times 10^6$ to about $4.0 \times 10^6$ dynes per square centimeter, the pressure in the hydraulic system being less than about 1600 p.s.i. and the apparent shear experienced by the all-particle form polyethylene resin as it passes from the extruder through the die gap being between about 10,000 to about 100,000 reciprocal seconds; closing the mold about the parison; and, introducing a fluid into the parison to expand it into the shape of the internal surface of the mold.

2. A process for blow molding polyethylene comprised substantially of particle form resins as described in claim 1 wherein the all-particle form polyethylene resin has a melt index of from about 0.4 to about 1.0 decigram per minute.

3. A process for blow molding polyethylene comprised substantially of particle form resins as described in claim 1 wherein the all-particle form polyethylene resin has a die swell of from about 3.7 to about 4.0.

4. A process for blow molding polyethylene comprised substantially of particle form resins as described in claim 1 wherein the all-particle form polyethylene resin has a critical stress for melt fracture of from about $1.5 \times 10^6$ to about $3.8 \times 10^6$ dynes per square centimeter.

5. A process for blow molding polyethylene comprised substantially of particle form resins as defined in claim 1 wherein the container is a milk bottle.

6. A process for blow molding polyethylene comprised substantially of particle form resins as defined in claim 5 wherein the polyethylene resin is blended with from about 0.1 to about 15 weight percent based on the total composition of a filler which restricts passage of ultra-violet rays through the bottle.

7. A process for blow molding polyethylene comprised substantially of particle form resins as defined in claim 6 wherein the filler is titanium dioxide and is present from about 0.5 to about 7 weight percent based on the total composition.

8. A process for blow molding polyethylene comprised substantially of particle form resins as defined in claim 6 wherein the filler is carbon black and is present from about 0.5 to about 7 weight percent based on the total composition.

References Cited

Clifford: "Predicting Blow-Moldability of High Density Pe," Spe Journal, September 1968, vol. 25, pp. 32–36.

ROBERT F. WHITE, Primary Examiner

J. H. SILBAUGH, Assistant Examiner

U.S. Cl. X.R.

260—41 R, 41 B, 94.9 D; 264—209, 211